E. F. MILLER.
Fastening Device.
No. 228,373.  Patented June 1, 1880.
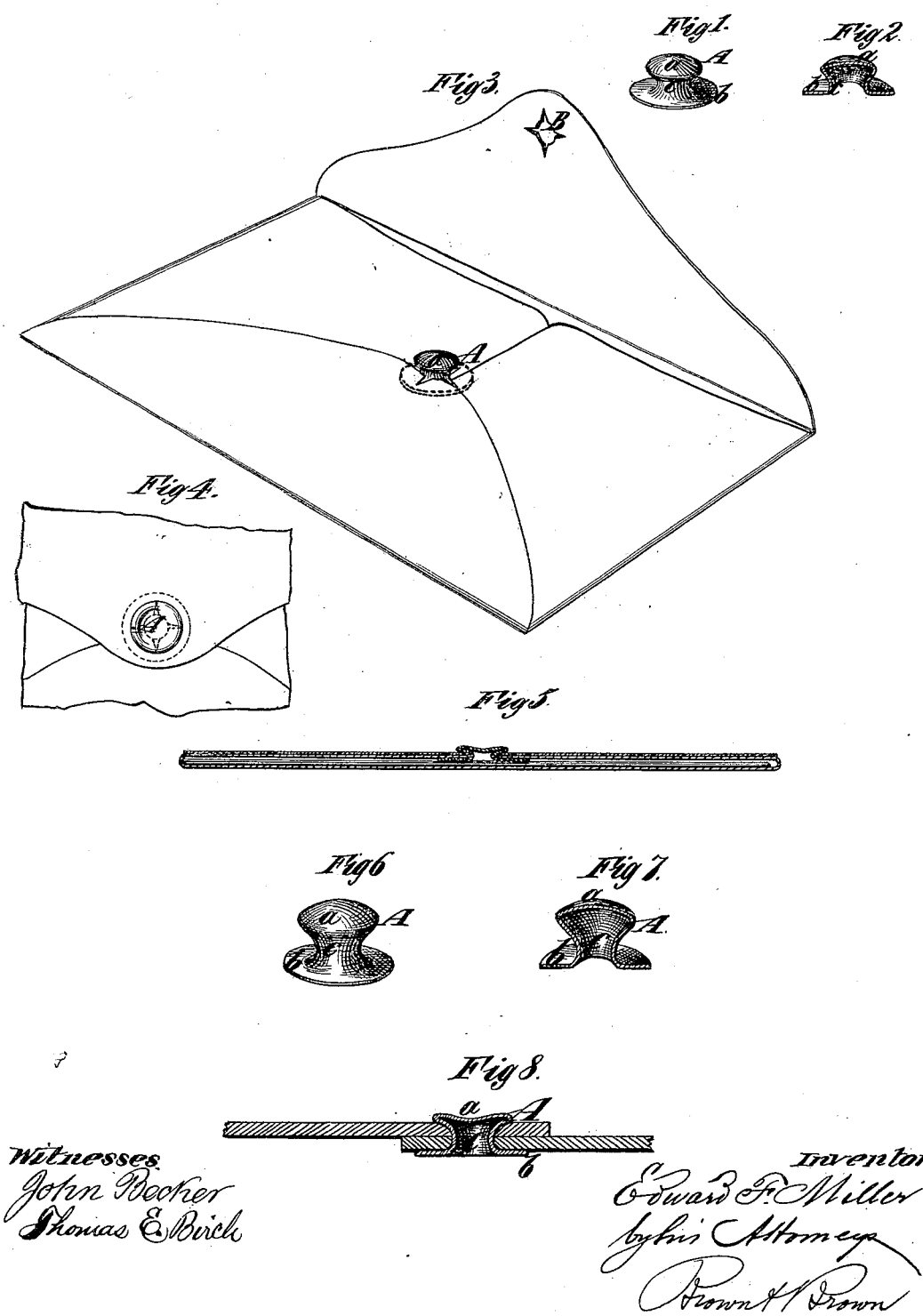

UNITED STATES PATENT OFFICE.

EDWARD F. MILLER, OF NEW YORK, N. Y.

FASTENING DEVICE.

SPECIFICATION forming part of Letters Patent No. 228,373, dated June 1, 1880.

Application filed November 8, 1879.

*To all whom it may concern:*

Be it known that I, EDWARD F. MILLER, of the city, county, and State of New York, have invented a certain new and Improved Fastening Device, of which the following is a specification.

My invention relates to fasteners or fastening devices which are to be used for securing envelopes or wrappers for letters or packages, or for securing together various parts of heavy garments, or for securing a lap-joint or seam in other articles, and to be used for many purposes as a substitute for an ordinary rivet.

The invention consists of a hollow metal rivet having a closed or covered crown or tip, such rivet being composed of a flanged cup, made of sheet metal, with a contracted neck.

Holes of a size to fit snugly around the neck of the rivet, and having radial notches or cuts, are made in the pieces of material to be united, and after the insertion of the rivet the closed crown or tip thereof is crushed inward or flattened, so as to spread out over and bite upon the material.

In the accompanying drawings, Figure 1 represents a perspective view of my improved fastening device. Fig. 2 represents a sectional perspective view thereof. Fig. 3 represents a perspective view of an envelope having such fastening device applied to it. Fig. 4 represents a plan of a portion of the envelope and the fastening device. Fig. 5 represents a section through said envelope. Figs. 6 and 7 represent, respectively, a perspective view and a perspective sectional view of a fastening device of larger size; and Fig. 8 illustrates the method of forming a lap-joint for uniting two pieces of material with such a device.

Similar letters of reference designate corresponding parts in all the figures.

A is the fastening device or hollow rivet, having its crown or tip $a$ closed or imperforate. This may be said to be composed of a cup, A, having a flange, $b$, and having a contracted neck, $c$. It is made of any suitable sheet metal or alloy—as, for instance, copper, brass, iron, or steel—by stamping, pressing, spinning, or other means.

For inserting the rivet a hole, B, is made in each of the pieces of material to be united, of sufficient size to fit snugly around the neck of the rivet, and having extending from it radial cuts or notches, as clearly shown in Fig. 3, and after its insertion the crown or tip of the cup or rivet is then forced inward by a blow or pressure, so as to flatten the rivet, and the crown or tip is thereby caused to lap sufficiently over the material around the hole and to bite and hold such material between the flange $b$ and the crown $a$, as clearly represented in Fig. 5.

These fastening devices may be used for various purposes. They may be used for fastening down the flaps of envelopes, as represented in Fig. 3, and when so used prevent the contents from being tampered with, as the envelope cannot be opened without tearing the paper. They may also be used for uniting some parts of heavy clothing, for uniting the parts of suspenders, and various other articles of wearing-apparel. They may be made of stouter sheet metal, like the one shown in Figs. 6 and 7, and may be used for uniting two pieces of leather by a lap-joint, as shown in Fig. 8.

These fastening devices are much lighter than solid rivets and burrs, and as it is composed of a single piece it may be much more readily applied.

I am aware that a fastening device has been composed of a flanged sheet-metal cup and a flanged hollow stud, the shank of the latter being inserted in the cup and the material to which it is attached being held between the two flanges, and I do not claim such device.

What I claim as my invention, and desire to secure by Letters Patent, is—

The cup-shaped sheet-metal rivet having the flange, the contracted neck, and the flaring head adapted to be crushed down upon the flange for securing the material between it and said flange, substantially as set forth.

EDWARD F. MILLER.

Witnesses:
FREDK. HAYNES,
THOMAS E. BIRCH.